US009110562B1

(12) United States Patent
Eldawy

(10) Patent No.: US 9,110,562 B1
(45) Date of Patent: Aug. 18, 2015

(54) SNAPPING A POINTING-INDICATOR TO A SCENE BOUNDARY OF A VIDEO

(75) Inventor: Mohamed Saad Eldawy, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 228 days.

(21) Appl. No.: 13/558,521

(22) Filed: Jul. 26, 2012

(51) Int. Cl.
*G06F 3/0481* (2013.01)

(52) U.S. Cl.
CPC .................................. *G06F 3/04812* (2013.01)

(58) Field of Classification Search
CPC .. G11B 27/34; H04N 5/44543; G06F 3/0482; G06F 3/04845; G06F 3/04855; G06F 3/04883; G06F 3/04812
USPC ............................ 715/719–726, 833, 863, 763
See application file for complete search history.

(56) References Cited

U.S. PATENT DOCUMENTS

| | | | | |
|---|---|---|---|---|
| 6,031,531 A * | 2/2000 | Kimble | ......................... | 715/862 |
| 6,693,653 B1 * | 2/2004 | Pauly | ............................ | 715/857 |
| 6,717,600 B2 * | 4/2004 | Dutta et al. | ..................... | 715/862 |
| 6,724,933 B1 * | 4/2004 | Lin et al. | ........................ | 382/164 |
| 6,844,887 B2 * | 1/2005 | Laffey et al. | ................... | 715/861 |
| 6,906,697 B2 * | 6/2005 | Rosenberg | ..................... | 345/156 |
| 7,096,427 B2 * | 8/2006 | Van De Streek et al. | ..... | 715/719 |
| 7,136,906 B2 * | 11/2006 | Giacalone, Jr. | ............... | 709/218 |
| 7,769,819 B2 * | 8/2010 | Lerman et al. | ................ | 709/217 |
| 8,316,301 B2 * | 11/2012 | Kim et al. | ..................... | 715/723 |
| 8,347,238 B2 * | 1/2013 | Leffert et al. | ................. | 715/863 |
| 8,566,751 B2 * | 10/2013 | Kelley et al. | .................. | 715/857 |
| 8,745,536 B1 * | 6/2014 | Davidson | ...................... | 715/850 |
| 8,920,241 B2 * | 12/2014 | Reville et al. | .................. | 463/37 |
| 2002/0061136 A1 * | 5/2002 | Shibata et al. | ................ | 382/199 |
| 2002/0186234 A1 * | 12/2002 | Van De Streek et al. | ..... | 345/719 |
| 2007/0033515 A1 * | 2/2007 | Sull et al. | .................... | 715/500.1 |
| 2009/0083626 A1 * | 3/2009 | Fitzmaurice et al. | ......... | 715/704 |
| 2010/0107118 A1 * | 4/2010 | Pearce | .......................... | 715/799 |
| 2010/0162151 A1 * | 6/2010 | Class et al. | .................... | 715/765 |
| 2010/0293190 A1 * | 11/2010 | Kaiser et al. | .................. | 707/769 |
| 2011/0141142 A1 * | 6/2011 | Leffert et al. | ................. | 345/659 |
| 2012/0042246 A1 * | 2/2012 | Schwesinger et al. | ........ | 715/716 |
| 2012/0092381 A1 * | 4/2012 | Hoover et al. | ................ | 345/662 |
| 2012/0144330 A1 * | 6/2012 | Flint | ............................. | 715/765 |
| 2012/0157208 A1 * | 6/2012 | Reville et al. | .................. | 463/39 |

\* cited by examiner

*Primary Examiner* — James T Durkin
(74) *Attorney, Agent, or Firm* — Lowenstein Sandler LLP

(57) ABSTRACT

A method and system are provided to facilitate navigating through a video. In one example, a video-player system identifies on a video-controller one or more scene-boundaries. A scene-boundary is associated with a video frame of a scene-start or a scene-end of a video. The video-player system receives a request to move a pointing-indicator. The pointing-indicator is a graphical element rendered on a display device of a video-player system and coincides with input to the video-player system. The video-player system calculates, in response to the request to move the pointing-indicator, a distance between the pointing-indicator and a particular scene-boundary. The video-player system determines whether the distance between the pointing-indicator and a particular scene-boundary is less than a threshold. The video-player system then snaps the pointing-indicator to the particular scene-boundary in response to determining the distance is less than the threshold.

22 Claims, 11 Drawing Sheets

SNAPPING A POINTING-INDICATOR TO A SCENE BOUNDARY OF A VIDEO

BACKGROUND

1. Technical Field

The subject matter disclosed herein relates to a method and system to facilitate navigating through a video.

2. Background Information

A video typically includes one or more scenes. A scene boundary may be located near the beginning of a scene. Another scene boundary may be located near the end of the scene.

SUMMARY

The present technology facilitates navigating through a video. In one example, a video-player system identifies, on a video-controller, one or more scene-boundaries. A scene-boundary is associated with a video frame of a scene-start and/or a scene-end of a video. The video-player system receives a request to move a pointing-indicator. The pointing-indicator is a graphical element rendered on a display device of a video-player system, and is configured to coincide with input to the video-player system. The video-player system calculates, in response to the request to move the pointing-indicator, a distance between the pointing-indicator and a particular scene-boundary. The video-player system determines whether the distance between the pointing-indicator and a particular scene-boundary is less than a threshold. The video-player system positions or "snaps" the pointing-indicator to the particular scene-boundary in response to determining the distance is less than the threshold.

The technology encompasses other implementations configured as set forth above and with other features and alternatives. This summary is not intended to identify key features or essential features of the claimed subject matter, nor is it intended to be used as an aid in determining the scope of the claimed subject matter.

BRIEF DESCRIPTION OF THE DRAWINGS

Implementations described herein will be readily understood by the following detailed description in conjunction with the accompanying drawings.

DETAILED DESCRIPTION

The present technology addresses difficulties with seeking a scene-boundary of a video by providing a video-player system that facilitates seeking of a scene-boundary. When seeking through a video, a user is typically interested in a particular scene. A video-player system typically enables a user to scrub through a video timeline. However, the continuous manner in which a video-player system may scrub makes seeking a scene-boundary difficult. A conventional video-player system typically resumes playback at an undesired intermediate point of a scene of the video. In contrast, a video-player system of the present technology snaps a pointing-indicator (e.g., mouse cursor) to a boundary-marker when the pointing-indicator is positioned less than a threshold-distance from the boundary-marker.

General Overview of Snapping Technology

Figure 1:
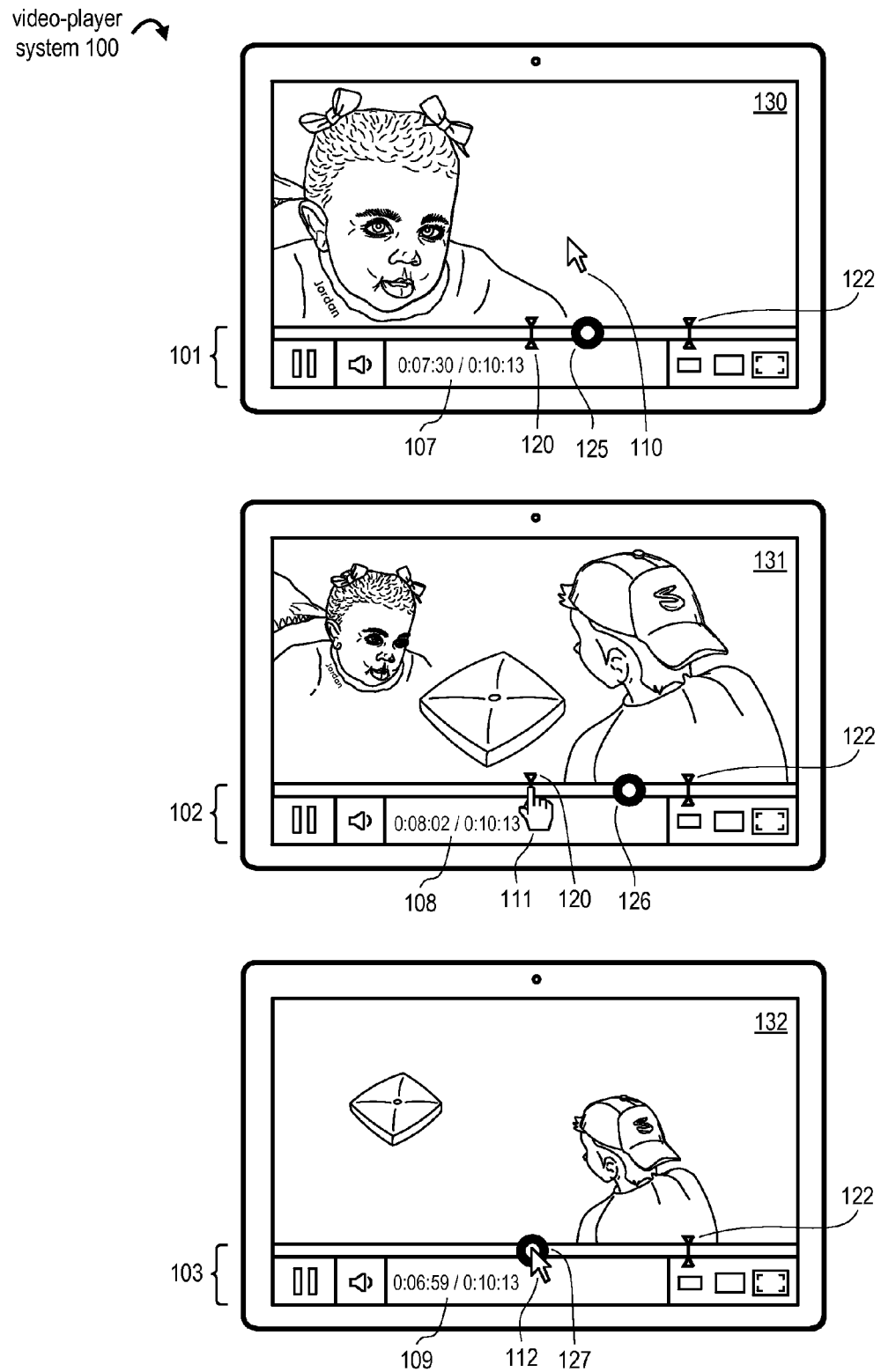
FIG. 1 is a conceptual diagram of actions of a video-player system snapping a pointing-indicator to a scene-boundary, in accordance with the technologies described herein.

FIG. 1 is a conceptual diagram of actions of a video-player system 100 snapping a pointing-indicator to a scene-boundary, in accordance with the technologies described herein. The video-player system 100 displays a video on a video display area of a display device 130. The video-player system 100 includes a video-controller 101 that enables a user to control playback and functionality of the video-player system 100. The video-controller 101 includes a video-clock 107, a boundary-marker 120, a boundary-marker 122, and a scrubber 125, among other features. In some implementations, the video display area of the display device 130 may include a window that includes a portion of the pixels of display device 130. For example, the video-player system 100 may include a web browser for displaying the video on the display device 130.

A boundary-marker (120 or 122) is a graphical representation of a scene-boundary of a scene of a video. Each scene-boundary is associated with a video frame of a scene-start or a scene-end. Each frame of the video coincides with a particular time on the video-clock 107. The scrubber 125 is a graphical element on the display device 130 that allows a user to scrub through a video by using a pointing-indicator 110 to interact with the video-player system 100. The pointing-indicator 110 coincides with input from a pointing device coupled to the video-player system 100. Examples of the pointing-indicator 110 include a mouse cursor that coincides with input from a computer mouse, a touchpad cursor that coincides with input from a touchpad, and/or a haptics-enable touchscreen that coincides with input from a finger or stylus, among other pointing-indicators.

The video-player system 100 can receive a request to move the pointing-indicator 110 near the video-controller 101. In one implementation, the video-player system 100 displays at least one boundary-marker (120, 122, and/or others) on the video-controller 101 of the video in response to the request to move the pointing-indicator 110 near the video-controller 101. The example of FIG. 1 shows two boundary-markers (120 and 122). The boundary-marker 120 is a graphical representation of a scene-boundary at the scene-start. The boundary-marker 122 is a graphical representation of the scene-boundary at the scene-end. The video-player system 100 may determine scene boundaries of a video based on an index associated with the video, for example, an index transmitted along with a bit stream or stored along with the video content.

Next, the video-player system 100 can receive a request to move the pointing-indicator 110. Upon receiving a request to move the pointing-indicator, the video-player system 100 calculates a distance between the pointing-indicator 110 and each of the scene-boundaries. For example, the video-player system 100 may receive a request to move the pointing-indicator 110 near the boundary-marker 120 or the boundary-marker 122. The video-player system 100 calculates a distance between the pointing-indicator 110 and the particular scene-boundary. The video-player system 100 determines if the distance between the pointing-indicator 110 and the particular scene-boundary is less than a threshold.

When the distance is not less than the threshold, the video-player system 100 makes itself available again to receive another request to move the pointing-indicator 110. For example, the video-player system 100 may continue to receive requests from a mouse, or other device, to move the pointing-indicator around the display device 130. The video-player system 100 can continue the cycle of receiving a move request and calculating a distance between the pointing-indicator and a scene-boundary. Meanwhile, the video-player system 100 may continue playing the video or performing another operation that may be in progress.

In the second diagram of FIG. 1, the video controller 102 is in a phase that illustrates that, once the distance between the pointing-indicator and a particular scene-boundary is less than the threshold, the pointing-indicator 111 snaps to the boundary-marker 120. In this example, the pointing-indicator 111 shows an updated graphical element that visually indicates the pointing-indicator 111 has snapped to the scene boundary, as shown on the display device 131. In some implementations, the visual snapping may be accompanied by the video-player system 100 generating an audio signal (e.g., audible click), a visual signal (e.g., highlighted pointing-indicator), and/or a touch signal (e.g., vibration on a haptics-enabled touchscreen).

At this point, the video may still be undergoing playback at a location represented by the scrubber 126. The video-clock 108 shows how far the playback has advanced in time. The snapping of the pointing-indicator 111 enables seeking of the scene-boundary represented by the boundary-marker 120. Accordingly, the video-controller of FIG. 1 facilitates seeking a scene-boundary (e.g., scene-start or scene-end) of a scene of the video.

In the third diagram of FIG. 1, the video-controller 103 is in a phase that illustrates that, once the pointing-indicator receives a click request or other selecting request, the scrubber moves to the snapped position, as shown on the display device 132. The pointing-indicator 112 shows an updated graphical element that visually indicates the following: the scrubber 127 has moved to the scene boundary; and/or the pointing-indicator 112 has unsnapped from the scene-boundary, as shown on the display device 132.

The video-clock 109 shows how the playback has reverted in time to the scene-start. The video may then continue playback from this updated position of the scrubber 127. In another example, a pointing-indicator may instead snap to the boundary marker at 122 and may send a selection of the scene boundary while at the boundary marker 122; and the scrubber 127 may then snap to scene-boundary that is graphically represented by the boundary-marker 122.

The video-player system 100 may include an online player (e.g., video-player embedded in a webpage) and/or an offline player (e.g., a desktop application or a tablet application that is independent of a browser and/or a network connection). In some implementations, the video-player system 100 may include a DVD (digital video disc) player or a Blu-ray Disc™ player. The video-player system 100 may be configured to run on a computer system coupled to an input device, such as a computer mouse, touchpad, and/or trackball, among other input devices. In such a case, the pointing-indicator (e.g., mouse cursor) can be configured to coincide with input from the input device. Alternatively, the video-player system may be configured to run on a computer device having a touchscreen (e.g., tablet computer, smart phone, etc.). In such a case, the pointing-indicator can be configured to coincide with input from a contact point on the touchscreen, which may incorporate haptics technology.

Snapping while Displaying a Boundary-Marker of a Scene-Start

Figure 2:
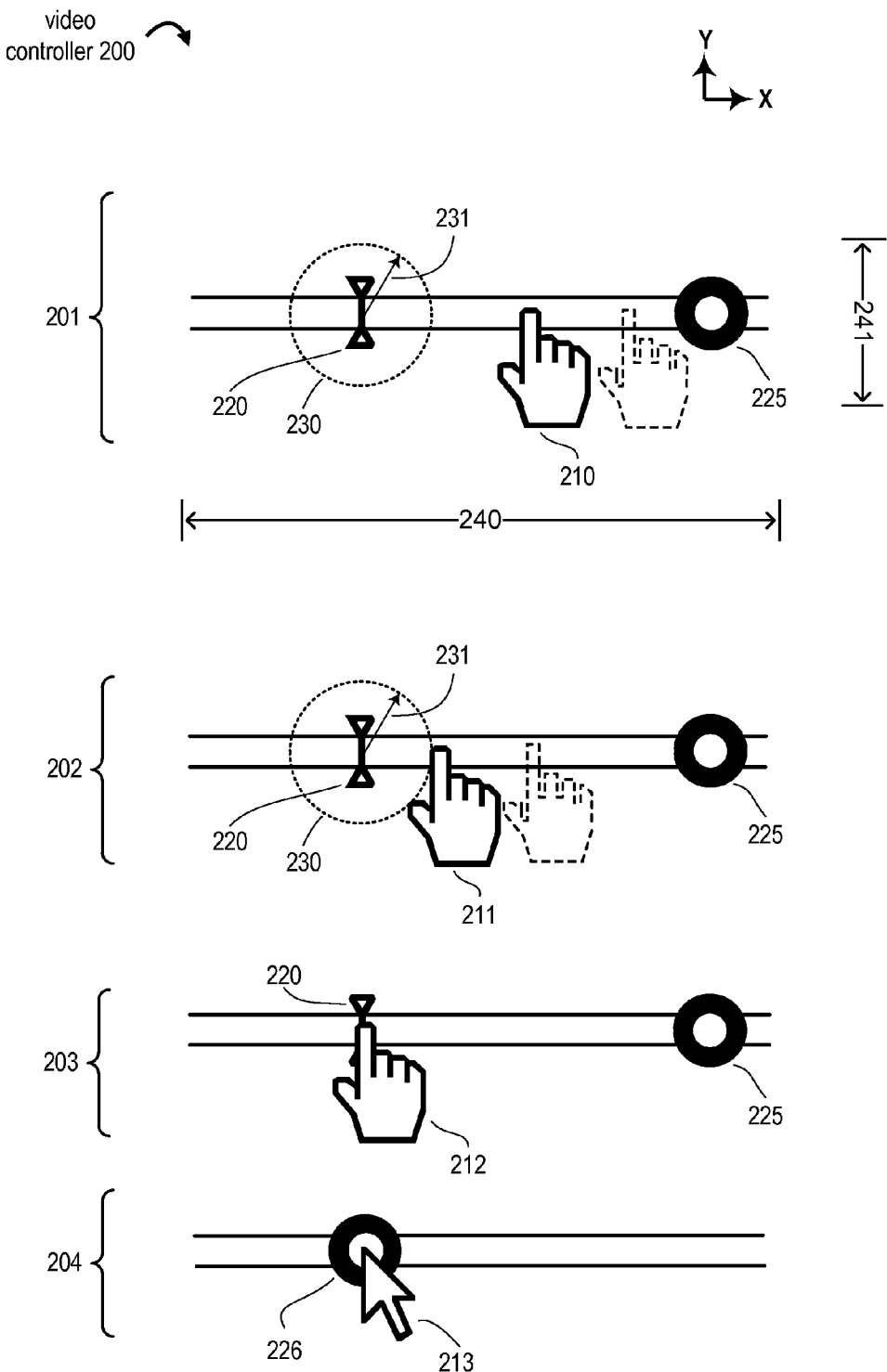
FIG. 2 is a conceptual diagram of an example video-controller snapping a pointing-indicator while displaying a boundary-marker of a scene-start, in accordance with the technologies described herein.

FIG. 2 is a conceptual diagram of an example video-controller 200 snapping a pointing-indicator while displaying a boundary-marker 220 of a scene-start, in accordance with the technologies described herein. This video-controller 200 enables a user to navigate through a video undergoing playback of a scene on a display device of a video-player system.

In a phase 201, the video-controller 200 receives a request to move a pointing-indicator 210 along the video controller. In one implementation, this request may include receiving a signal that the pointing-indicator 210 is being dragged along the video-controller 200 in a certain direction, such as predominately parallel to the X-axis. In another implementation, this request may include receiving a signal that the pointing-indicator 210 has been both selected (e.g., clicked) and dragged along the video-controller 200 in a certain direction, such as predominately parallel to the X-axis. As the pointing-indicator 210 is moving toward the beginning scene-boundary, the video-player system displays the boundary-marker 220, which is a graphical representation of the scene-boundary at the scene-start.

The video-player system is regularly calculating the distance between the pointing-indicator 210 and the scene-boundary, which is represented graphically by the boundary-marker 220. Pixels surround the scene-boundary. In this example of FIG. 2, the video-player system can define the surrounding pixels as being within a circle 230 having a radius 231 that extends from the center of the scene-boundary to the circumference of the circle 230. Coordinates of a two-dimensional coordinate system (X and Y) may further define the circle 230. The unit of measurement for the radius 231 may be pixels on the display device, inches, millimeters, or any other acceptable unit of measurement. For example, the radius 231 may be configured to have any length between 0 and 300 pixels on the display device, or any other acceptable range. For instance, the video-player system may define the radius 231 as having a length of 14 pixels, extending from the center of the scene-boundary that is graphically represented by the boundary-marker 220.

The video-player system may automatically set the length of a suitable radius 231. For example, the video-player system may calculate the suitable radius 231 based on the size of the video-controller 201, a window displaying the video, the display device, and/or the video-player system. In this example, the video-controller 201 has a length 240 and a width 241 in a two-dimensional coordinate system (X and Y), with the length 240 being greater than the width 241. The unit of measurement for the dimensions of the video-controller may be the same unit of measurement used for the radius 231, which is described above. The video-player system may calculate the radius 231 as being proportional to the length 240 and/or the width 241. For example, if the video-player system is configured to have a radius of 15 pixels for a length 240 that is 200 pixels, then the video-player system may automatically set the radius to be 30 pixels if the length 240 of the video-controller 201 increases to 400 pixels. The size of the video-controller may change, for example, if a user changes the size of the window displaying the video. In short, the radius 231 may be proportional to the size of the video-controller 201, which may be proportional to the size of the video window, which may by proportional to the size of the display device, which may be proportional to the size of the video-player system. A change in any of these items may automatically cause a change in the size of the radius 231. The video-controller 201 may set a minimum size of the radius 231, which the radius size will not decrease below regardless of the change in the window size, among other things. In another example, the size of the radius is absolute and does not change with a change in the window size, among other things.

In one example, the video-player system may receive instructions from a user to set the radius 231 manually. For example, the video-player system may provide the user with an options menu to set the length of the radius 231. Such an options menu is discussed below with reference to FIG. 8.

In a phase 202 of FIG. 2, the pointing-indicator 211 moves closer to the boundary-marker 220. Once the video-player system calculates the distance between the pointing-indicator 211 and the boundary-marker 220 is less than the radius 231 (e.g., a threshold of 14 pixels), the video-player system snaps the pointing-indicator 211 to the boundary marker 220.

In a phase 203, the pointing-indicator 212 is shown as being snapped to the boundary-marker 220. In some implementations, snapping means the pointing-indicator 212 is substantially fixed to the boundary-marker 220 and will not move until the video-player system receives a significant and deliberate request to move the pointing-indicator 212 from the snapped position. At this point, the video may still be undergoing playback at a location represented by the scrubber 225. The video-player system provides the user an option of using the pointer-marker 220 to select the boundary-marker 220, for example, by clicking on the boundary-marker 220 or otherwise changing the state of an input device while on the boundary-marker 220. For example, in FIG. 2, the video-player receives a request from the user to click on the boundary-marker 220 by using the pointing-indicator 212. In another example, the video-player may receive a signal indicating that the user has released a mouse button that was held down while the user dragged the pointing-indicator 212. In another example, the video-player may receive a signal indicating that the user has removed a stylus or finger from the surface of a touch-screen.

In a phase 204, the video-player system has moved the scrubber 225 to a new position represented by a scrubber 226. The scrubber 226 is located substantially at the scene-boundary that was represented by the boundary-marker 220. The video-player system may resume playback at the updated position represented by the scrubber 226. The pointing-indicator 213 shows an updated graphical element that visually indicates the following: the scrubber 226 is located substantially at the scene boundary; and/or the pointing-indicator 211 has unsnapped from the scene-boundary and updates to show the pointing-indicator 213. The pointing-indicator 213 is free to move. The video-player system can freely respond to requests to move the pointing-indicator 213.

In another implementation, the video-controller 200 may receive a request to select the scrubber 225 and to drag the scrubber 225 along the video-controller 200. The video-controller 200 may then display at least one boundary marker. FIG. 2 displays the beginning boundary-marker 220 for explanatory purposes. In one implementation, the video-player system can either pause playback or continue playback while the pointing-indicator 220 is performing click-and-drag operations on the scrubber 225. As the pointing-indicator 220 drags the scrubber 225 along the video controller 200 and the scrubber 225 surpasses a threshold (e.g., radius 231), the video-controller 200 can snap the scrubber 225 to the scene-boundary. The video-player system may resume playback from the scene-boundary at which the video-controller 200 snapped the scrubber 225. For example, the video-player system may resume playback after the video-player system identifies a click button on a mouse is released. In response to the button release, the pointing-indicator 220 can release control of the scrubber 225 so the video-player system can resume playback from the scene-boundary at which the video-controller 200 snapped the scrubber 225.

Snapping while Displaying a Boundary-Marker of a Scene-End

Figure 3:
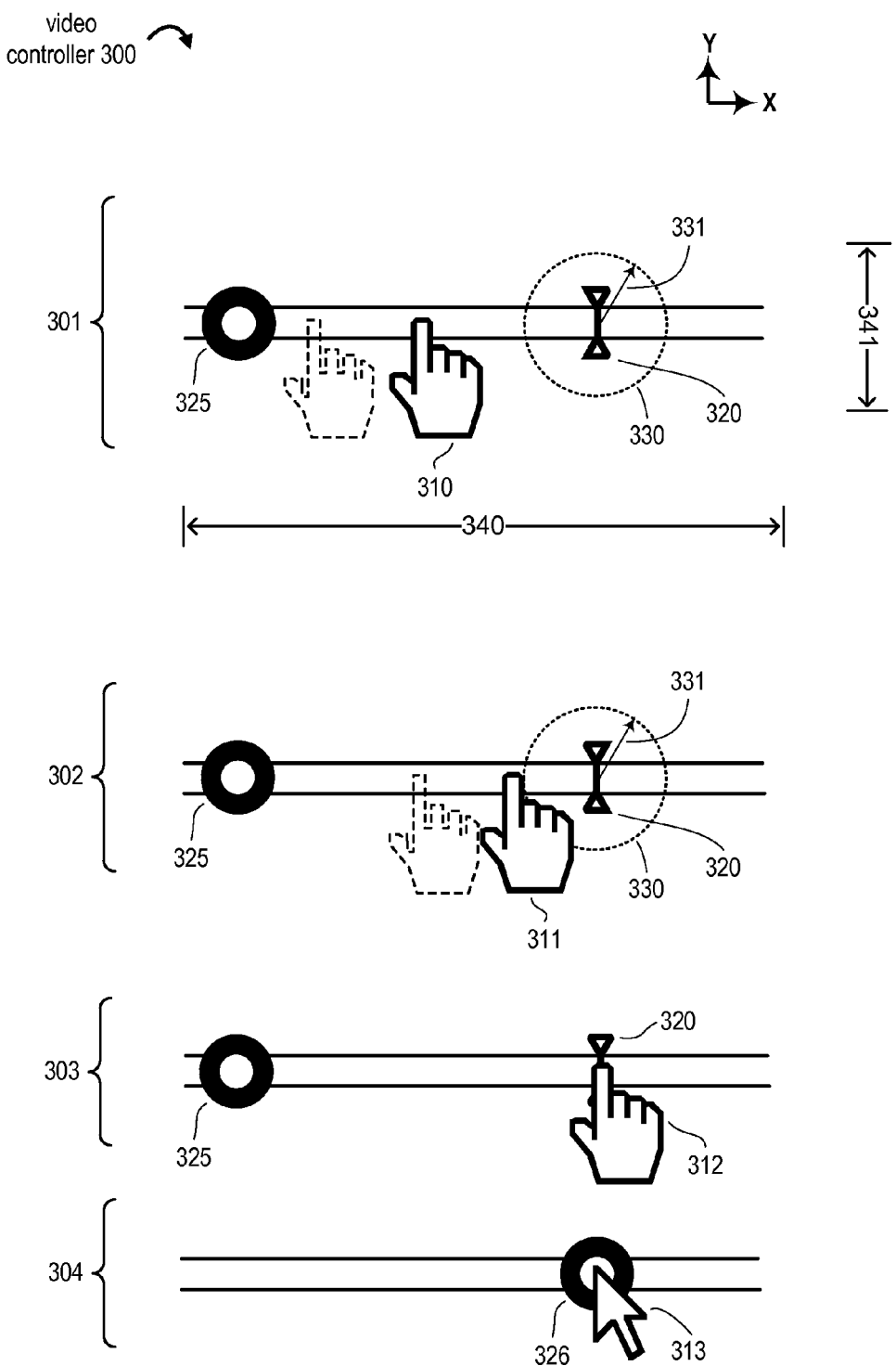
FIG. 3 is a conceptual diagram of an example video-controller snapping a pointing-indicator while displaying a boundary-marker of a scene-end, in accordance with the technologies described herein.

FIG. 3 is a conceptual diagram of an example video-controller 300 snapping a pointing-indicator while displaying a boundary-marker 320 of a scene-end, in accordance with the technologies described herein. This video-controller 300 enables a user to navigate through a video undergoing playback of a scene on a display device of a video-player system.

This example is similar to the example of FIG. 2, except the pointing-indicator of FIG. 3 is moving toward a scene-boundary at the end of the scene, as shown in phases 301, 302, 303, and 304. The video-controller 300 includes a scrubber 325, and a boundary-marker 320, among other features. The boundary-marker 320 has a surrounding circle 330 with a radius 331 that extends from the center of the boundary-marker 320 to the circumference of the circle 330. The video-controller 301 has a length 340 and a height 341. The pointing-indicators 310, 311, 312, and 313 are illustrated as moving toward the ending boundary-marker 320 and snapping thereto. The video-player system moves the scrubber 325 to the snapped position represented by a scrubber 326 once the video-player system receives a request for the scrubber 325 to move to the snapped position.

Snapping while Displaying Two or More Boundary-Markers

Figure 4:
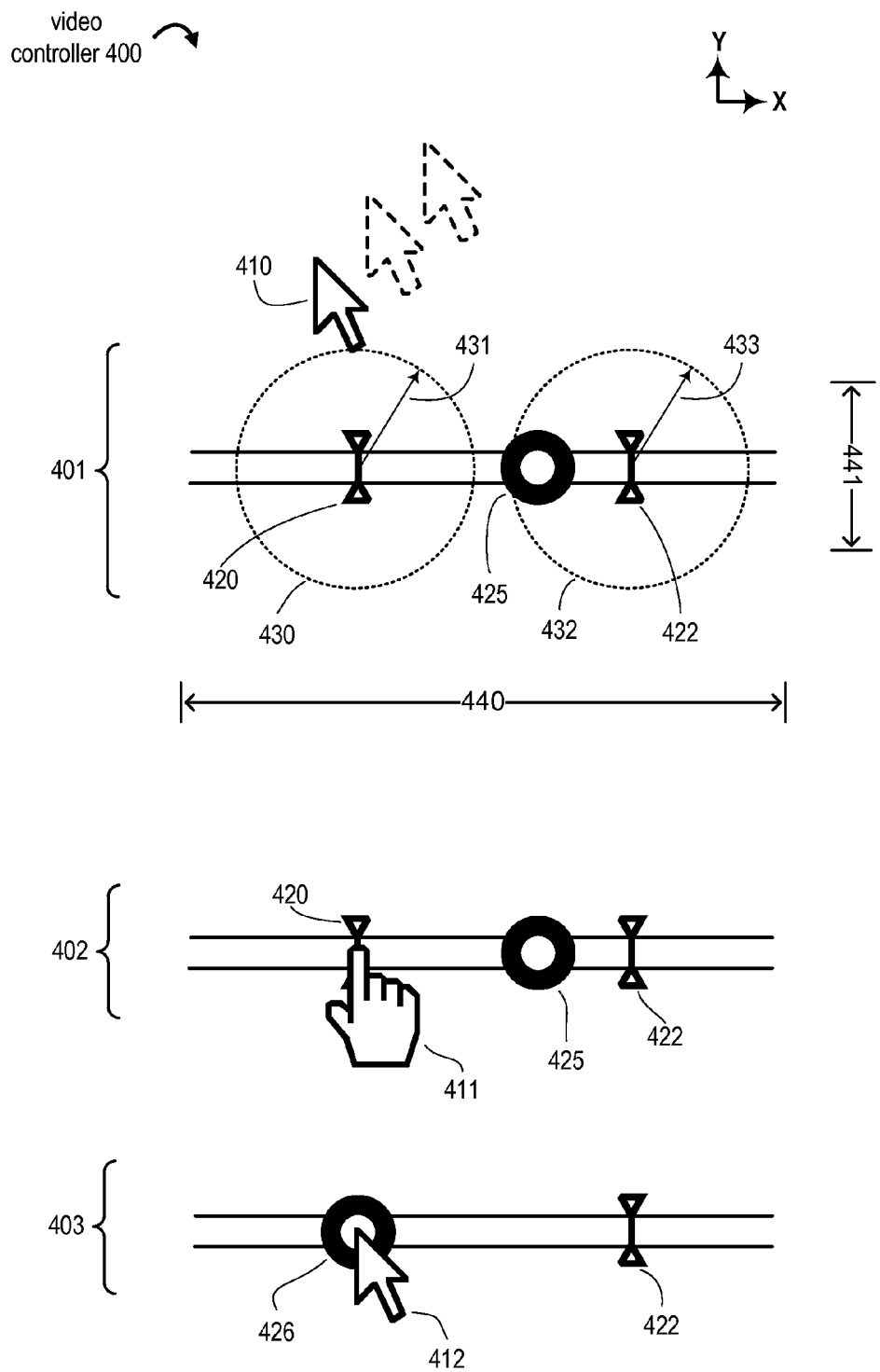
FIG. 4 is a conceptual diagram of an example video-controller snapping a pointing-indicator while displaying two boundary-markers and, in accordance with the technologies described herein.

FIG. 4 is a conceptual diagram of an example video-controller 400 snapping a pointing-indicator while displaying two boundary-markers 420 and 422, in accordance with the technologies described herein. This video-controller 400 enables a user to navigate through a video undergoing playback of a scene on a display device of a video-player system.

This example is similar to the example of FIG. 2, except the video-controller 400 displays two or more boundary-markers, as shown in phases 401, 402, and 403. In a phase 401, the video-controller 400 receives a request to move a point-indicator 410 on the display device. In this example of FIG. 4, as the pointing-indicator 410 is moving toward the video-controller, the video-player system displays the boundaries markers 420 and 422. The boundary-marker 420 is a graphical representation of the scene-boundary at the scene-start. The boundary-marker 422 is a graphical representation of the scene-boundary at the scene-end. In another example, the video-player system may show one or more scene-boundaries of other scenes of the video. The video-controller 400 of FIG. 4 has a length 440 and a width 441. A radius 431 extends from the center of the boundary-marker 420 to the circumference of a circle 430. A radius 433 extends from the center of the boundary-marker 422 to the circumference of a circle 432. The radii 431 and 433 may have the same length or may have different lengths.

The pointing-indicator 410 moves closer to the boundary-marker 420. Once the video-player system calculates the distance between the pointing-indicator 410 and the boundary-marker 420 is less than the radius 431 (e.g., a threshold of 14 pixels), the video-player system snaps the pointing-indicator 410 to the boundary-marker 420.

In a phase 402, the pointing-indicator 411 is shown as being snapped to the boundary-marker 420. In some implementations, snapping means the pointing-indicator 411 is substantially fixed to the boundary-marker 420 and will not move until the video-player system receives a significant and deliberate request to move the pointing-indicator 411 from the snapped position. At this point, the video may still be undergoing playback at a location represented by the scrubber 425. The video-player system provides the user an option of using the pointer-marker 420 to click on the boundary-marker 420. In this example of FIG. 4, the video-player receives a request from the user to click on the boundary-marker 420 by using the pointing-indicator 411.

In a phase 403, the video-player system has moved the scrubber 425 to a new position represented by a scrubber 426. The scrubber 426 is located substantially at the scene-boundary that was represented by the boundary-marker 420. The video-player system may resume playback at the updated position represented by the scrubber 426. The pointing-indicator 412 shows an updated graphical element that visually indicates the following: the scrubber 426 is located substantially at the scene boundary; and/or the pointing-indicator 411 has unsnapped from the scene-boundary and updates to show the pointing-indicator 412. The pointing-indicator 412 is free to move. The video-player system can freely respond to requests to move the pointing-indicator 412.

Snapping while Displaying No Boundary-Markers

Figure 5:
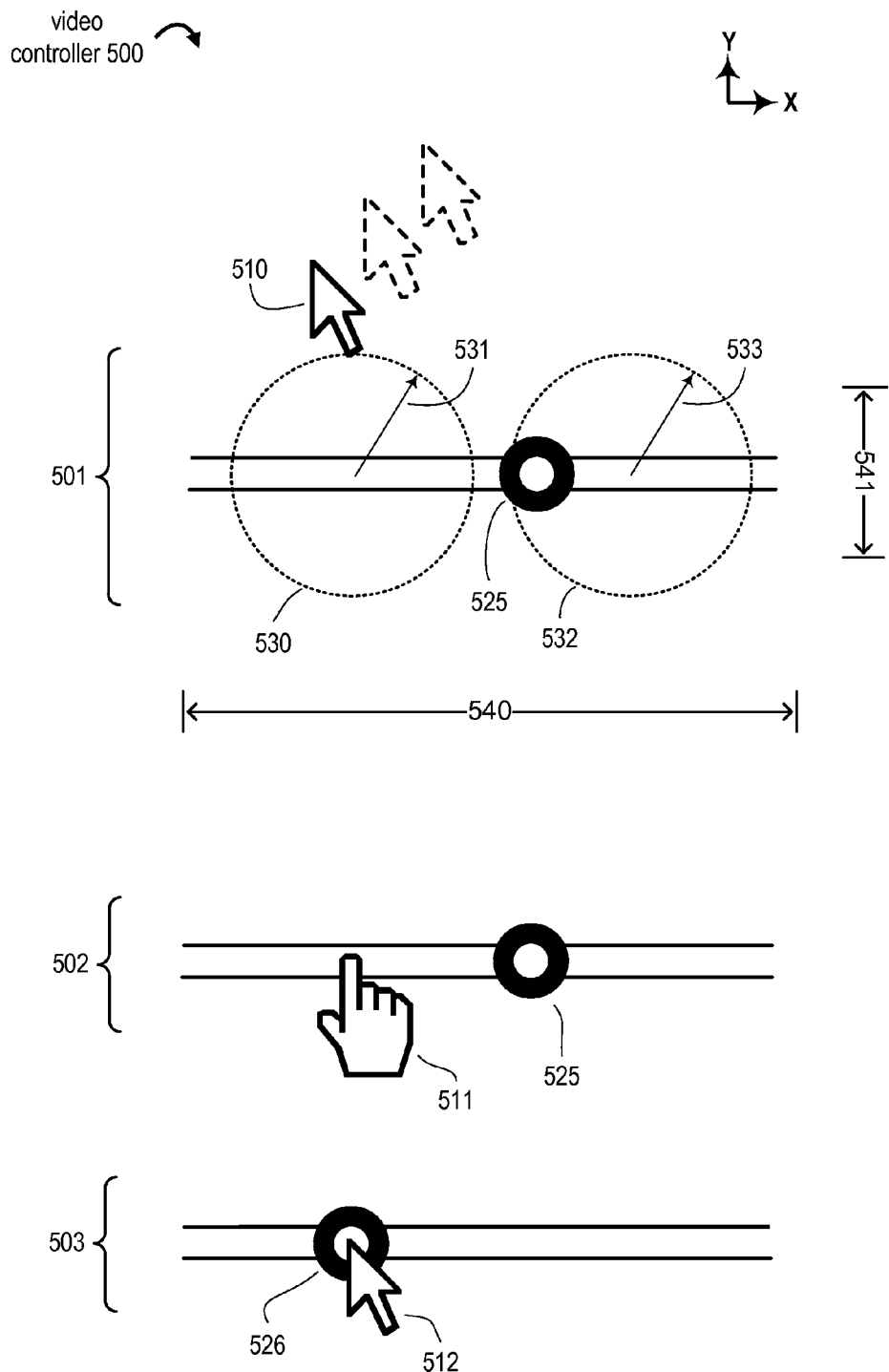
FIG. 5 is a conceptual diagram of an example video-controller snapping a pointing-indicator while displaying no boundary-markers, in accordance with the technologies described herein.

FIG. 5 is a conceptual diagram of an example video-controller 500 snapping a pointing-indicator while displaying no boundary-markers, in accordance with the technologies described herein. This video-controller 500 enables a user to navigate through a video undergoing playback of a scene on a display device of a video-player system.

This example is similar to the example of FIG. 4, except the video-player system of FIG. 5 does not display any boundary-markers, as shown in phases 501, 502, and 503. The video-controller 500 includes a scrubber 525, among other features. The scene-start has a surrounding circle 530 with a radius 531 that extends from the center of the scene-boundary to the circumference of the circle 531. The ending scene-boundary has a surrounding circle 532 with a radius 533 that extends from the center of the scene-boundary to the circumference of the circle 532. The video-controller 501 has a length 540 and a height 541. The pointing-indicators 510, 511, and 512 are illustrated as moving toward the scene-start and snapping thereto. The video-player system moves the scrubber 525 to the snapped position represented by a scrubber 526 once the video-player system receives a request for the scrubber 525 to move to the snapped position.

Snapping while Displaying a Snapshot of a Video Frame

Figure 6:
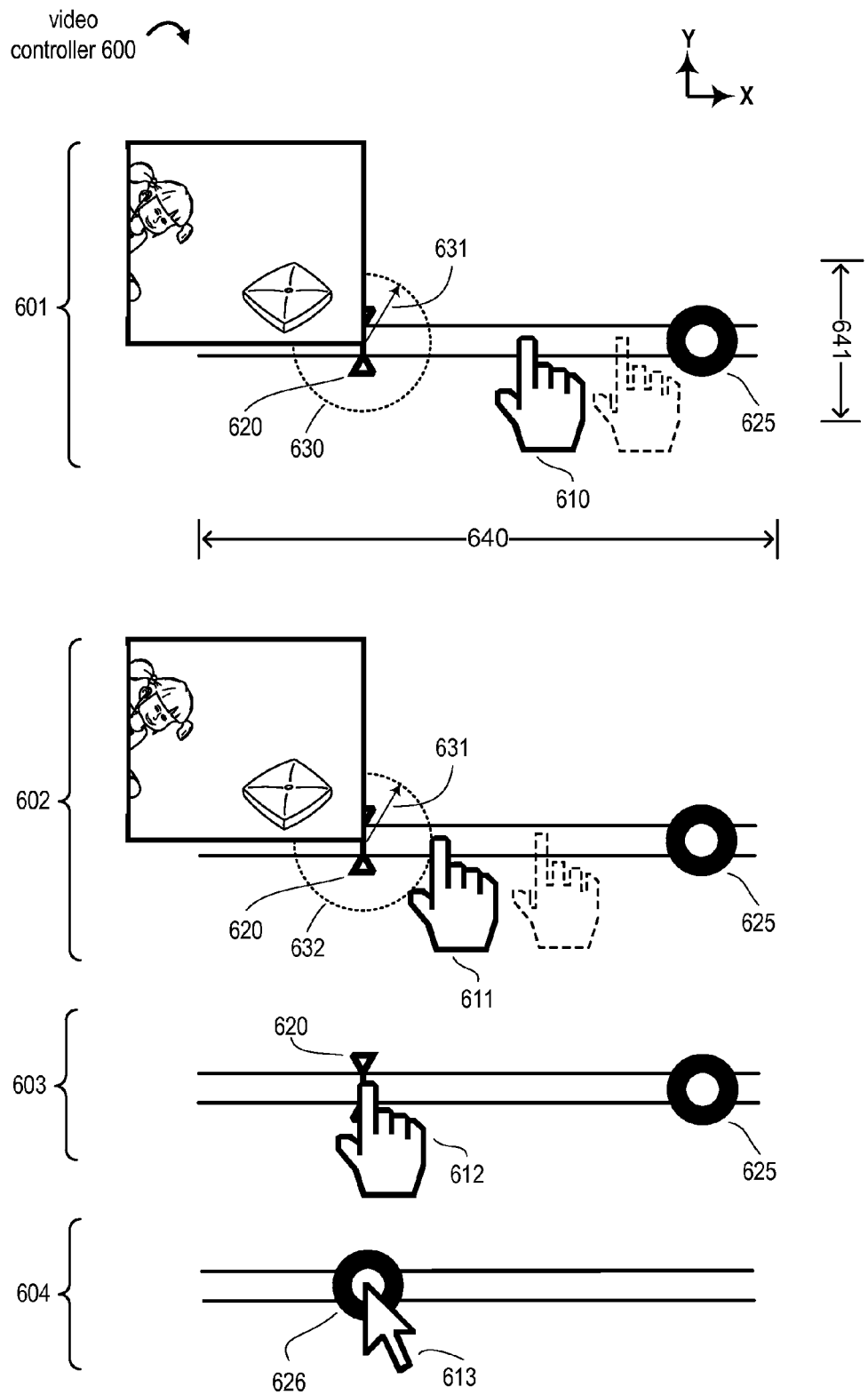
FIG. 6 is a conceptual diagram of an example video-controller snapping a pointing-indicator while displaying a snapshot of a frame of a video, in accordance with the technologies described herein.

FIG. 6 is a conceptual diagram of an example video-controller 600 snapping a pointing-indicator while displaying a snapshot of a frame 607 of a video, in accordance with the technologies described herein. This video-controller 600 enables a user to navigate through a video undergoing playback of a scene on a display device of a video-player system.

This example is similar to the example of FIG. 2, except the scene-boundary in FIG. 6 is displayed in conjunction with the frame 607 of the video, as shown in phases 601, 602, 603, and 604. The video-controller 600 includes a scrubber 625, and a boundary-marker 620, among other features. The boundary-marker 620 has a surrounding circle 630 with a radius 631 that extends from the center of the boundary-marker 620 to the circumference of the circle 630. The pointing-indicators 610, 611, 612, and 613 are illustrated as moving toward the ending boundary-marker 620 and snapping thereto. The video-player system moves the scrubber 625 to the snapped position represented by a scrubber 626 once the video-player system receives a request for the scrubber 625 to move to the snapped position. Alternatively, the point-indicator 610 may be moving to a scene-boundary near the end of the scene. In such a case, the displayed frame may be a snapshot of the video near the scene-boundary at the end of the scene.

The frame 607 includes a snapshot of the video near the scene-boundary at the scene-start. The frame 607 allows the user to see a preview of the video at the scene-boundary. The frame 607, other frames of the video, a video-clock, and scene-boundaries, among other data, may be located in a local memory (e.g., cache) of the video-player system for quick access. In some implementations, the video-player system may have previously downloaded this data from a server to the local memory. The video-player system can display the frame 607 by accessing the frame that coincides with the scene-boundary. The video-player system may reference each scene-boundary in memory by using a particular time on the video-clock, which coincides with frames of the video and/or an index.

While the examples above describe a generally circular region of pixels around a boundary-marker having a radius (e.g., radius 231, 331, 431, 531, or 631), it shall be appreciated that a threshold region near a boundary-marker in accordance with this disclosure can be of any shape, including a rectangular shape, an oval, among other shapes. Additionally, while figures associated with the examples above illustrate a boundary-marker that is generally circular, it shall be appreciated that a boundary-marker in accordance with this disclosure may be of any shape or have various appearances.

Snapping Technology that Includes Haptics Functionality

Figure 7:
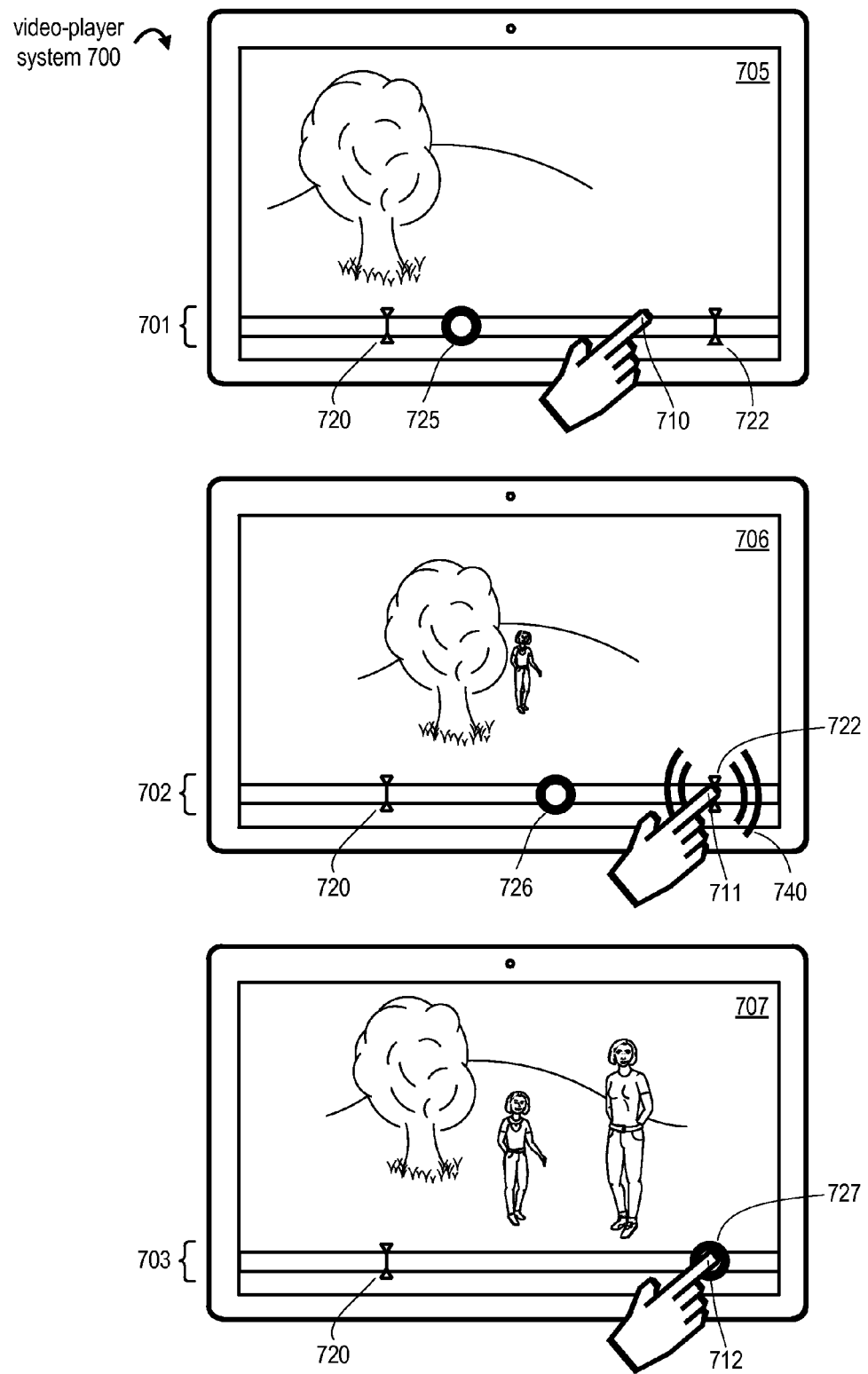
FIG. 7 is a conceptual diagram of an example video-player system snapping a pointing-indicator while using haptics functionality, in accordance with the technologies described herein.

FIG. 7 is a conceptual diagram of an example video-player system 700 snapping a pointing-indicator while using haptics functionality, in accordance with the technologies described herein. The video controller 701 enables a user to navigate through a video undergoing playback of a scene on a touch-screen 705 of the video-player system 700. The video is undergoing playback of a scene at a position represented by a scrubber 725 on the video-controller 701. The video-player system 700 displays the video-controller 701 with a scene-boundary 720 of the scene-start and a scene boundary 722 of the scene-end. Alternatively, the video-player system 700 can display zero, one, or more than two boundary-markers, as described above with reference to FIGS. 1-6.

In the first diagram of FIG. 7, the video-controller 701 is in a phase where a pointing-indicator 710 interacts with the video-controller 701, such as by a user touching the haptics-enabled touchscreen 705. In this example, the pointing-indicator 710 is a contact point of a human finger on the touchscreen 705. Alternatively, the pointing-indicator 710 may be the contact point of a stylus on the touchscreen 705, or the contact of another object that is suitable for touching the touchscreen 705. The pointing-indicator 710 can be visually represented similarly to the pointing-indicators of FIGS. 1-6, which show the pointing-indicator as a graphical element (e.g., mouse cursor) on a display device.

In this example, the user seeks a scene-boundary by dragging the pointing-indicator 710 (e.g., contact point of finger) along the touchscreen toward a boundary-marker 722. Alternatively, the video-player system 700 does not necessarily display any boundary-markers, as described above.

In the second diagram of FIG. 7, the video-controller 702 is in a phase where the video-player system 700 snaps to a scene-boundary by generating a vibration 740 to the pointing-indicator 711 via the touchscreen 706. The video-player system 700 generates the vibration 740 when the location of the pointing-indicator 711 arrives at the scene-boundary represented by the boundary-marker 722. Note the video is now undergoing playback of a scene at an updated position of the scrubber 725, represented by a scrubber 726 on the video-controller 702.

Alternatively, the video-controller 702 may generate a graduated vibration that progressively increases in magnitude as the pointing-indicator 711 moves progressively closer to the scene-boundary represented by the boundary-marker 722. For example, the video-player system 700 can calculate the distance between the pointing-indicator 711 and the boundary-marker 722. A threshold distance around a scene-boundary is described above with reference to FIGS. 1-6. In this example, when the video-player system 700 calculates the distance between the pointing-indicator 711 and the boundary-marker 722 is less than a threshold (e.g., a radius of pixels), the video-player system 700 may begin generating the graduated vibration. The video-player system 700 may start with a weaker vibration and progressively increase to a stronger vibration as the pointing-indicator 711 moves closer to the scene-boundary.

In the third diagram of FIG. 7, the video-controller 703 is in a phase where the video-player system 700 moves the scrubber 726 to an updated position that is represented by a scrubber 727. For example, the video-player system 700 may receive a tap from the pointing-indicator 712 on the touchscreen 707. In another example, the video-player system 700 may identify the pointing indicator 712 has remained substantially still on the touchscreen 707 at the scene-boundary for a particular passage of time (e.g., 2 seconds). In response to receiving the tap or identifying the passage of time, the video-player system 700 can move the scrubber 726 to the updated position that is represented by the scrubber 727. The video-player system can continue playback or pause playback at the video location that is represented by the scrubber 727.

This example of FIG. 7 shows the pointing-indicator 712 arriving at a scene-end. However, the pointing-indicator 712 may arrive at any other scene-boundary, such as the scene-start represented by the boundary-marker 720. Additionally, the video-player system may provide other feedback in addition to, or alternatively to, vibration. For example, the video-player system may provide a small indicator light and/or sound, such as a ping or an audible click.

More Features of the Snapping Technology

Figure 8:
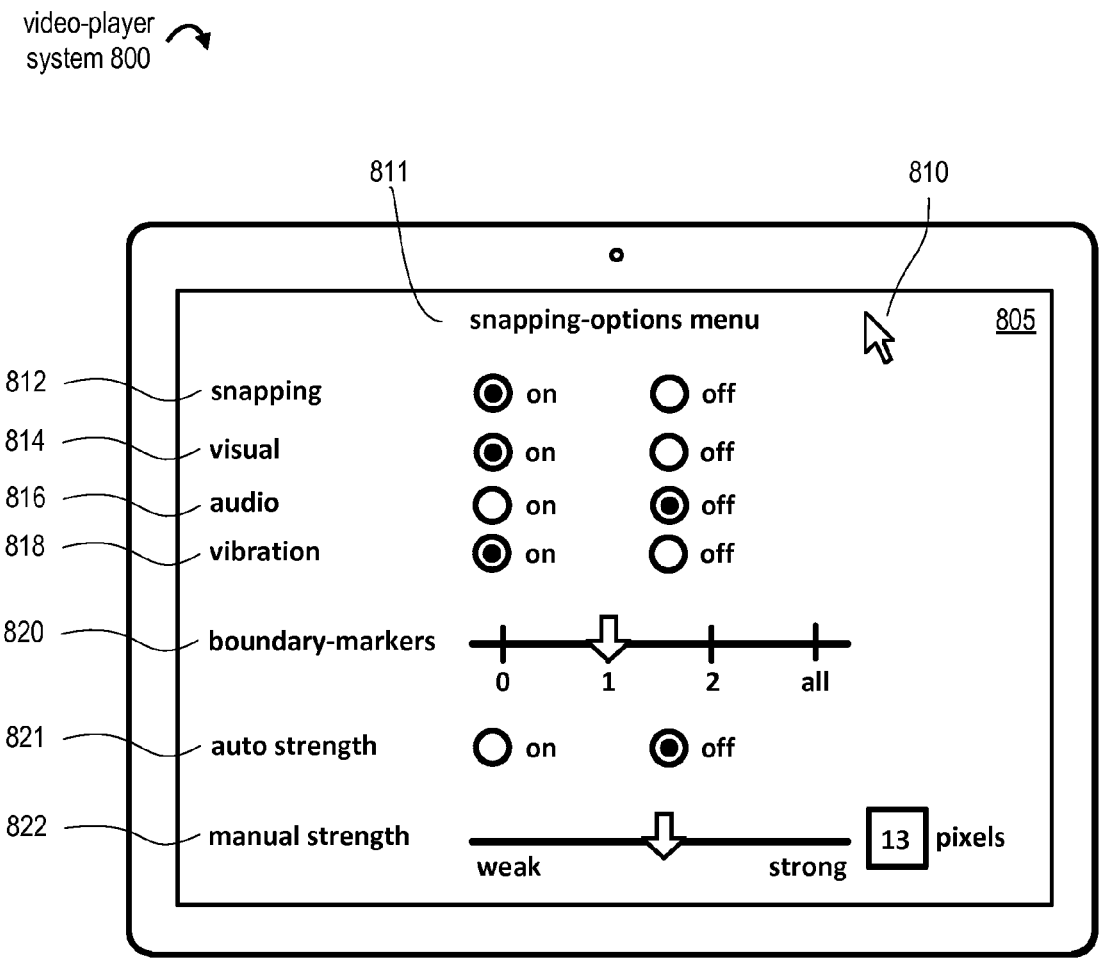
FIG. 8 is a conceptual diagram of an example snapping-options menu, in accordance with the technologies described herein.

FIG. 8 is a conceptual diagram of an example snapping-options menu 810, in accordance with the technologies described herein. The snapping-options menu 811 is a user-interface that enables a user to control snapping functionality on a display device 805 of a video-player system 800. In this example, the snapping-options menu 811 includes controls for the snapping 812, the visual 814, the audio 816, the vibration 818, the boundary-markers 820, the auto-strength 821, and the manual strength 822.

A snapping-options menu may include, radio buttons, drop-down menus, pop-up menus, sliders, value field, and/or checkboxes, among other features. For example, the video-player system 800 includes radio buttons for turning on or off the snapping 812, the visual 814, the audio 816, the vibration 818, and the auto strength 821.

When the snapping 812 is on, the snapping functionality of the video-player system 800 is active. When the snapping 812 is off, the snapping functionality of the video-player system 800 is inactive. In some implementations, a user may control whether snapping 812 is on or off by depressing a right-click button on a computer mouse, or by using some other input device that can send a signal to the video-player system 800. The video-player system 800 may receive such a signal from an input device while the video is undergoing playback.

When the visual 814 is on, the video-player system 800 generates a visual signal (e.g., highlighted or flashing pointing-indicator) when the pointing-indicator 810 snaps to a scene-boundary. When the visual 814 is off, the video-player system 800 does not display an enhanced visual signal for the snapping.

When the audio 816 is on, the video-player system 800 generates an audio signal (e.g., an audible click) when the pointing-indicator 810 snaps to a scene-boundary. When the audio 816 is off, the video-player system 800 does not generate an audio signal in association with the snapping.

When the vibration 816 is on, the video-player system 800 generates a vibration (e.g., on a touchscreen) in association with a pointing-indicator (e.g., contact point of finger) approaching or reaching a scene-boundary. When the vibration 818 is off, the video-player system 800 does not generate a vibration in association with the snapping.

When the auto strength 821 is on, the video-player system 800 automatically calculates the threshold distance. The concept of automatically setting a threshold distance is discussed above with reference to FIG. 2. When the auto strength 821 is off, the video-player system 800 does not automatically calculate a threshold distance, and instead uses a custom set value for example.

In the example shown in FIG. 8, the snapping-options menu 811 also includes sliders for the boundary-markers 820 and the manual strength 822. By using the pointing-indicator 810, a user may instruct the video-player system 800 to set the video-controller to display zero, one, two, or all boundary-markers 820 of a video. Snapping while displaying zero boundary-markers is discussed above with reference to FIG. 5. Snapping while displaying one boundary-marker is discussed above with reference to FIGS. 2 and 3 for example. Snapping while displaying two or more boundary markers is discussed above with reference to FIG. 4 for example.

By using the pointing-indicator 810, a user may instruct the video-player system 800 to set the video-controller to have a particular manual strength 822. This example of FIG. 8 shows a snap strength of 13 pixels as the threshold distance. The concept of a threshold distance is discussed above with reference to FIG. 2 for example. A weak snap-strength may include, for example, a setting between 0 to 5 pixels for the threshold distance from the scene-boundary. A strong snap-strength may include, for example, a setting between 25 and 30 pixels for the threshold distance. These values for weak and strong manual strength 822 are provided for explanatory purposes. Other values for snap-strength may be more suitable, depending on the desired behavior of the video-player system 800. Additionally, the video-player system may set a maximum threshold distance based on a particular video and the smallest distance between scenes of the video, for example, to avoid threshold distances of neighboring scene-boundaries overlapping.

Method Overview

Figure 9:
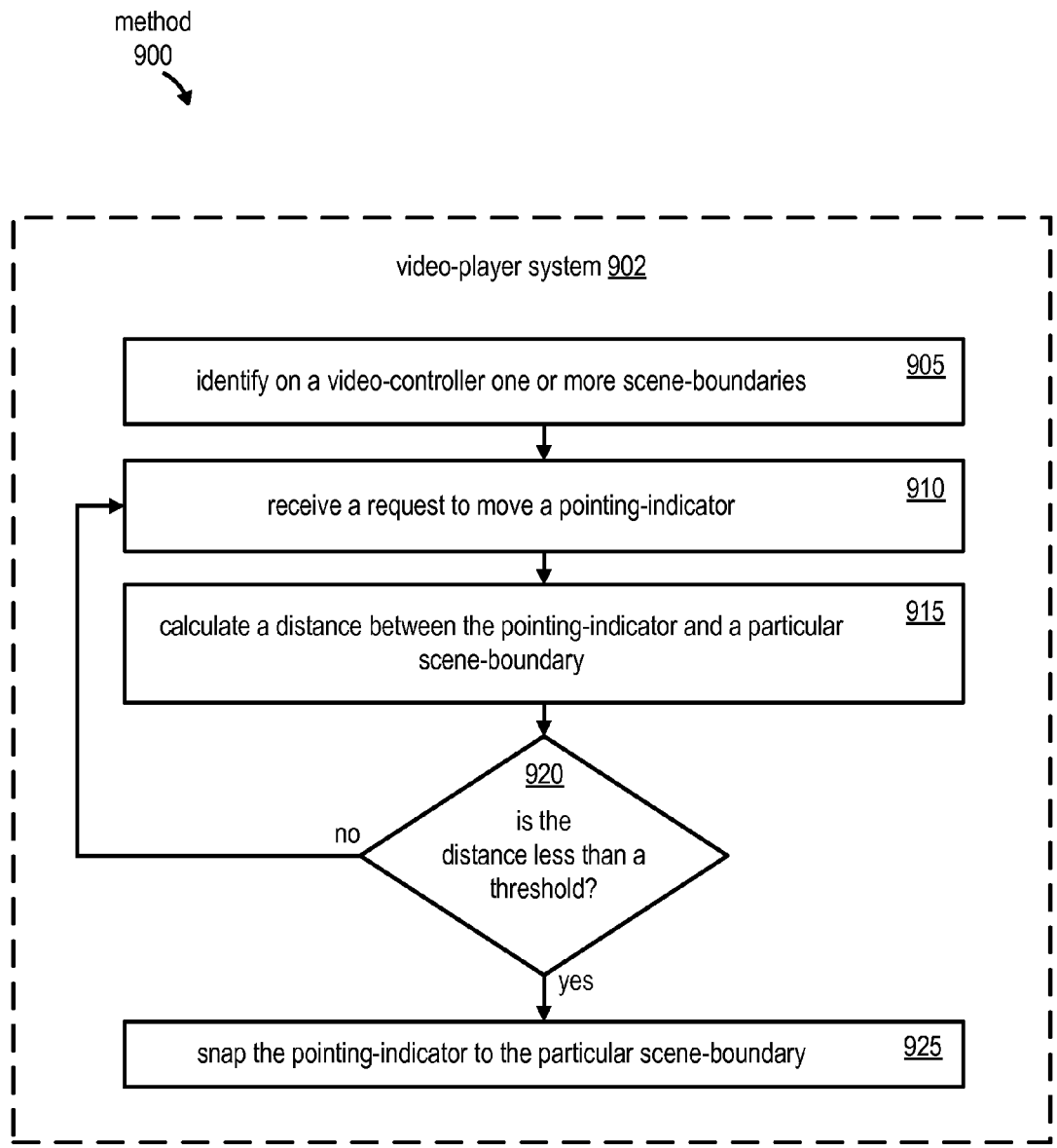
FIG. 9 is a flowchart of a method to facilitate snapping a pointing-indicator to a scene-boundary of a scene of a video, in accordance with the technologies described herein.

FIG. 9 is a flowchart of a method 900 to facilitate snapping a pointing-indicator to a scene-boundary of a scene of a video, in accordance with the technologies described herein. This method 900 enables a user to navigate through a video undergoing playback of a scene on a display device of a video-player system 902.

In an action 905, the video-player system 902 identifies on a video-controller one or more scene-boundaries. The video-controller may include zero or more boundary-markers that are associated with the scene-boundaries, as described above with reference to FIGS. 1-7.

In an action 910, the video-player system 902 receives a request to move a pointing-indicator. For example, the video-player system 902 may receive a request to move the pointing-indicator over a video display area and toward the video-controller.

In an action 915, the video-player system 902 calculates a distance between the pointing-indicator and a particular scene-boundary. The video-player system 902 can regularly calculate this distance in order to respond appropriately to user-initiated actions to seek a scene-boundary.

In a decision action 920, the video-player system 902 determines if the calculated distance is less than a threshold. If the video-player system 902 determines the calculated distance is not less than a threshold, then the video-player system 902 returns to the action 910 and continues to be available to receive a request to move the pointing-indicator, such as over the video display area.

However, if the calculated distance is less than the threshold, then the method proceeds to an action 925 where the video-player system 902 snaps the pointing-indicator to the scene-boundary.

This method 900 may include other actions and/or details that are not discussed in this method overview. Other actions and/or details are discussed with reference to other figures (e.g., dragging the pointer-indicator while holding down a mouse button, or snapping to a scene-boundary after generating a vibration) and may be a part of the method 900, depending on the implementation.

System Overview

Figure 10:
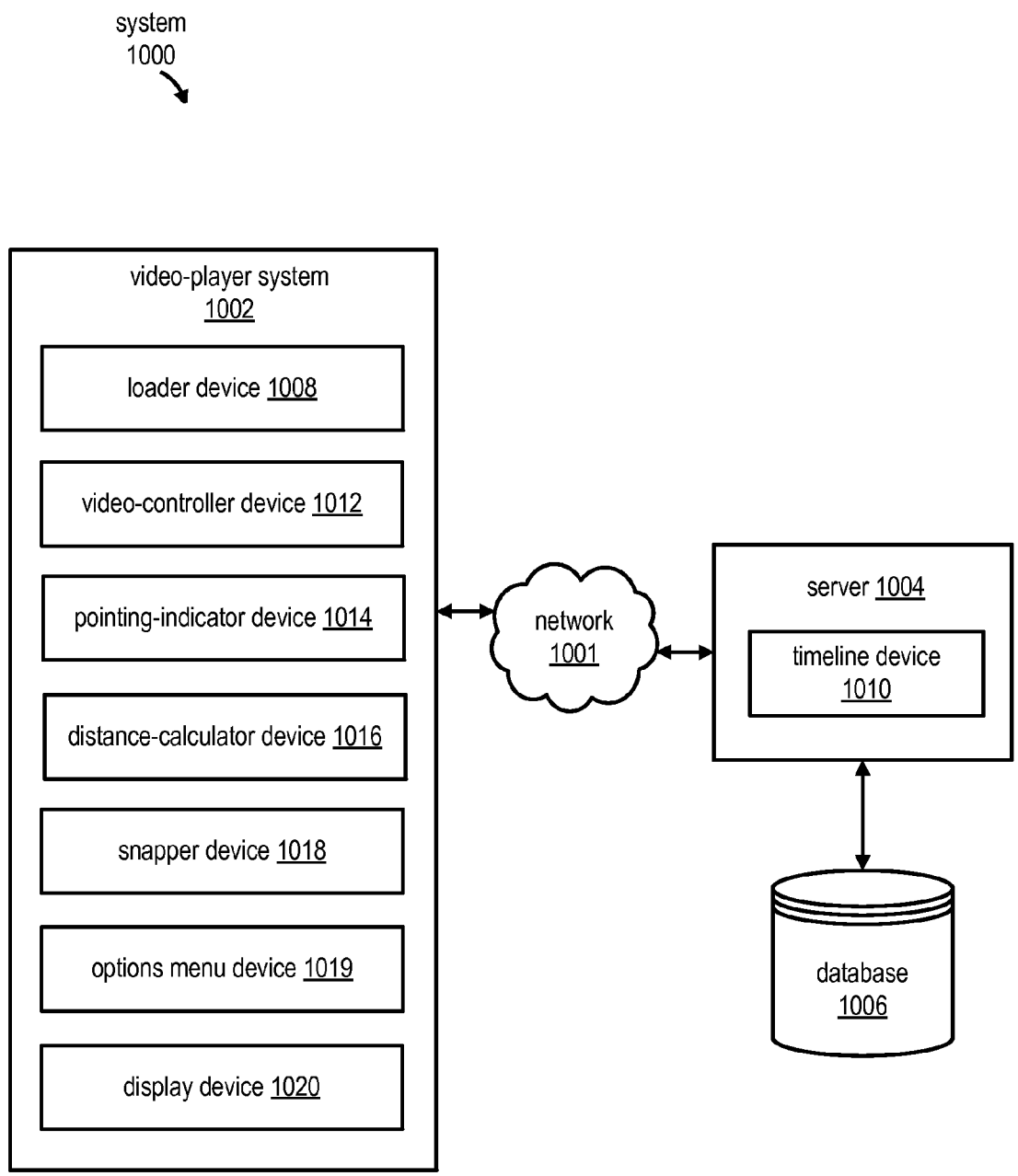
FIG. 10 is a block diagram of a system configured to snap a pointing-indicator to a scene-boundary of a scene of a video, in accordance with the technologies described herein.

FIG. 10 is a block diagram of a system 1000 configured to snap a pointing-indicator to a scene-boundary of a scene of a video, in accordance with the technologies described herein. In this example, a network 1001 couples a video-player system 1002, a server 1004, and a database 1006. Alternatively, the server 1004 and/or the database 1006 may be a part of the video-player system 1002.

In this example, the server 1004 includes without limitation a timeline device 1010. Alternatively, a timeline device (not shown) may be a part of the video-player system 1002. The timeline device 1010 is configured to identify, detect, and/or locate one or more scene boundaries of a video. For example, after a user uploads a video to the server 1004, the timeline device 1010 may compute similarities between frames across a timeline of the video. At each frame of the video, the timeline device 1010 may calculate a frame's similarity profile, which describes the frame's similarities to nearby frames. The timeline device 1010 may identify a significantly unique frame in the video (e.g., a scene-boundary) as having a similarity profile that is noticeably different from similarity profiles of nearby frames. Accordingly, the timeline device 1010 may automatically identify, detect, and/or locate scene boundaries of scenes of a video. In one implementation, the timeline device 1010 identifies, detects, and/or locates scene boundaries of scenes of a video based at least in part on an index, such as a seek index, that may be transmitted in a bit stream associated with the video and/or stored with the video contact.

The server 1004 may then store the scene-boundary information in the database 1006 along with the video content, metadata, and/or any other information. Alternatively, if the video-player system 1002 performs the scene-boundary identification, then video-player system 1002 may store the scene boundary information for subsequent use.

The video-player system 1002 includes without limitation a loader device 1008, video-controller device 1012, a pointing-indicator device 1014, a distance-calculator device 1016, a snapper device 1018, an options menu device 1019, and a display device 1020. Examples of the video-player system 1002 include without limitation a tablet computer, a cell phone, a smart phone, a mobile phone, a handheld computer, a laptop computer, a desktop computer, a digital video-player system, a streaming video-player system, and/or an optical disc player. A device is hardware or a combination of hardware and software. In one implementation, the video-player system 1002 may be installed in a tablet computer, a cell phone, a smart phone, a mobile phone, a handheld computer, a laptop computer, a desktop computer, a digital video-player system, a streaming video-player system, and/or an optical disc player, among other devices.

The loader device 1008 is configured to load at least a portion of a video, among other things, to a local memory (e.g., cache and/or RAM). For example, the loader device 1008 may download at least a portion of a video from the server 1004 to a local memory of the video-player system. Alternatively, the loader device 1008 may load, for example, at least a portion of the video from a local hard disk of the video-player system 1002. Generally, the intent here is to begin loading a video into a local memory (e.g., cache and/or RAM) that enables the video-player system 1002 to have quick access to the video with little latency.

In some implementations, the loader device 1008 can download to the video-player system 1002 software code that enables the video-player system 1002 to carry out methods of the present technology. For example, the server 1004 and/or another server may send, to a browser of the video-player system 1002, software code (e.g., browser plugin, JavaScript™ file, Adobe Flash™ file, etc.) that configures the video-controller device 1010, the pointing-indicator device 1012, the distance-calculator device 1014, the snapper device 1018, and/or the options menu device 1019.

The pointing-indicator device 1014 includes software code that configures the pointing-indicator. The pointing-indicator may include a cursor, a mouse cursor, a trackball cursor, a joystick cursor, a pointing stick cursor, a touchpad cursor, a contact point of a finger on a touchscreen, and/or a contact point of a stylus on a touchscreen, among other pointing-indicators. The pointing-indicator is coupled to a positioning device that enables a user to control the pointing-indicator. The positioning device may include a pointing device, a computer mouse, a trackball, a joystick, a pointing stick, a touchpad, a touchscreen, a finger, and/or a stylus, among other positioning device. A request to move the pointing-indicator may include a pointing device event, a computer mouse event, a trackball event, a joystick event, a pointing stick event, a touchpad event, a touchscreen event, a finger event, and/or a stylus event, among other events.

The video-controller device 1012 includes software code that defines graphical objects for the boundary-markers and/or for the scrubber. The software code of the video-controller device 1012 also includes parameters that define the conditions under which a pointing-indicator will snap to a boundary-marker. For example, the software code may describe how the pointing-indicator shall snap to a particular boundary-marker if the pointing-indicator is less than a threshold distance from the particular boundary-marker.

The loader device 1008 is also configured to download from the server 1004, or other source, the timeline for the video. The timeline includes, among other things, one or more scene-boundaries. A scene-boundary is a time location of where a scene begins or ends. The loader device 1002 can then load to local memory (e.g., cache and/or RAM) the timeline, including the one or more scene-boundaries. Alternatively, a timeline may be previously stored on a local memory of the video-player system 1002.

The loader device 1008 does not need to load fully the video on the video-player system 1002 before the loader device 1008 loads the timeline device 1010 to a local memory. In this example, the video-player system 1002 may download the timeline, including the scene-boundaries, from the server 1004, specifically, the timeline device 1010. Alternatively, the timeline may be already stored on a local memory of the video-player system 1002.

The distance-calculator device 1016 includes software code that configures the video-player system 1002 for calculating a distance between a pointing-indicator and a particular scene-boundary. The software code of the distance-calculator device 1016 also configures the video-player system 1002 to determine if the calculated distance is less than a threshold.

The snapper device 1018 includes software code that configures the video-player system 1002 to snap a pointing-indicator to a particular scene-boundary. The software code of the snapper device 1018 may also configure the video-player system 1002 to unsnap the pointing-indicator from the particular scene-boundary.

The options menu device 1019 configures the video-player system 1002 to provide a user-interface that enables a user to control snapping functionality on the display device 1020. The display device 1020 configures the video-player system 1002 to display a video, a video-controller, a pointing-indicator, at least one boundary-marker, a scrubber, and a timeline, among other graphics. The display device 1020 may also include a haptics-enabled touchscreen, among other devices.

Examples of the video-player system 1002 include a tablet computer, a cell phone, a smart phone, a mobile phone, a handheld computer, a laptop computer, a desktop computer, a DVD player, and/or a Blu-ray Disc™ player, among other systems. A device is hardware or a combination of hardware and software.

Example Computer Implementation

Figure 11:
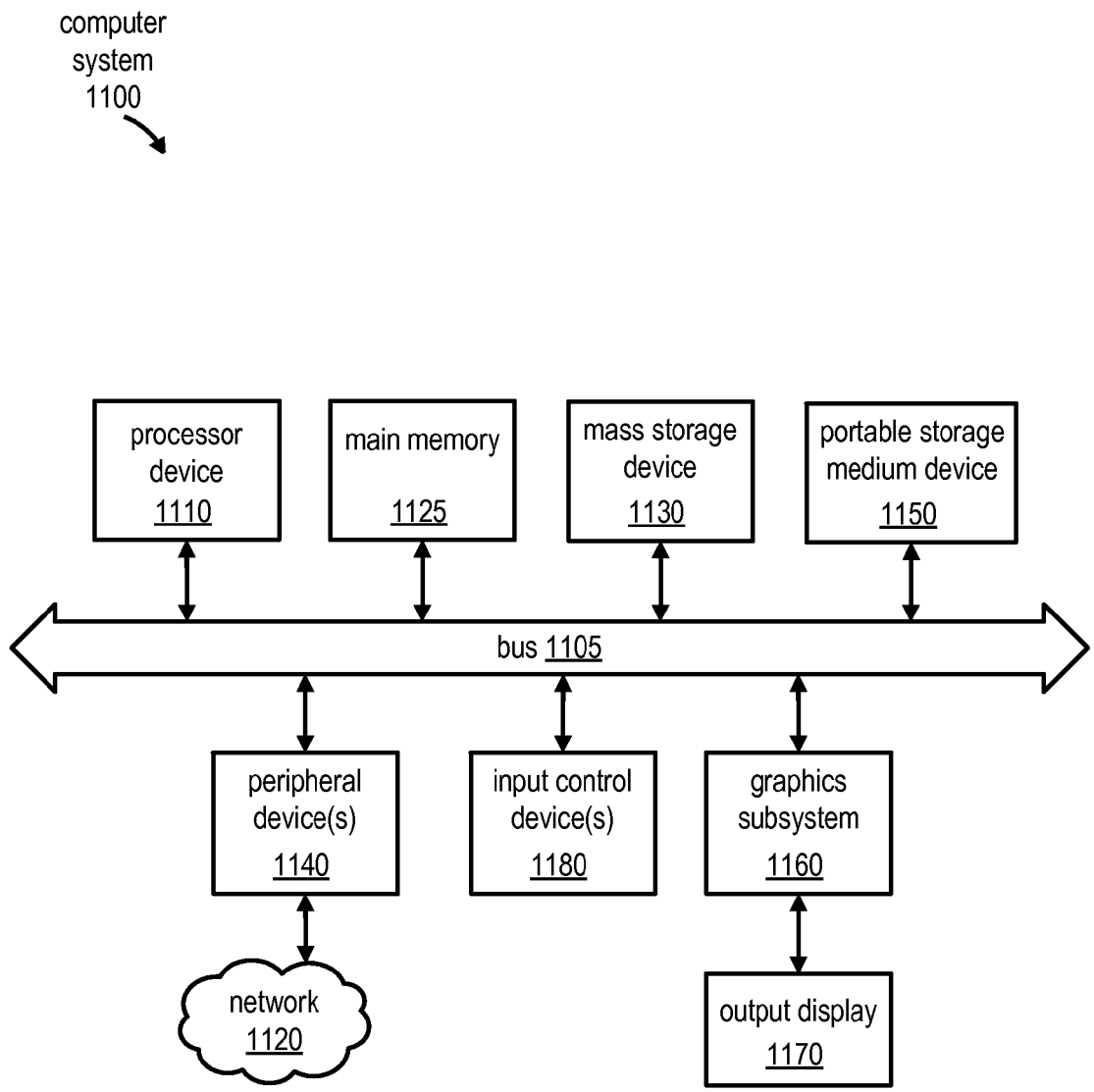
FIG. 11 is a block diagram of an example general-purpose or special-purpose computer system that can implement, at least in part, the technologies described herein.

FIG. 11 is a block diagram of an example general-purpose or special-purpose computer system 1100 that can implement, at least in part, the technologies described herein. The computer system 1100 may include, for example, a server, a client computer, and/or a consumer electronics device, among other things.

The computer system 1100 may include without limitation a processor device 1110, a main memory 1125, and an interconnect bus 1105. The processor device 1110 may include without limitation a single microprocessor, or may include a plurality of microprocessors for configuring the computer system 1100 as a multi-processor system. The main memory 1125 stores, among other things, instructions and/or data for execution by the processor device 1110. If the system is partially implemented in software, the main memory 1125 stores the executable code when in action. The main memory 1125 may include banks of DRAM (dynamic random access memory), as well as cache memory.

The computer system 1100 may further include a mass storage device 1130, peripheral device(s) 1140, portable storage medium device(s) 1150, input control device(s) 1180, a graphics subsystem 1160, and/or an output display 1170. For explanatory purposes, all components in the computer system 1100 are shown in FIG. 11 as being coupled via the bus 1105. However, the computer system 1100 is not so limited. Devices of the computer system 1100 may be coupled through one or more data transport means. For example, the processor device 1110 and/or the main memory 1125 may be coupled via a local microprocessor bus. The mass storage device 1130, peripheral device(s) 1140, portable storage medium device(s) 1150, and/or graphics subsystem 1160 may be coupled via one or more input/output (I/O) buses. The mass storage device 1140 may be a nonvolatile storage device for storing data and/or instructions for use by the processor device 1110. The mass storage device 1130 may be implemented, for example, with a magnetic disk drive or an optical disk drive. In a software implementation, the mass storage device 1130 may be configured to load contents of the mass storage device 1130 onto the main memory 1125.

The portable storage medium device 1150 operates in conjunction with a nonvolatile portable storage medium, such as, for example, a CD ROM (compact disc read only memory), to input and output data and code to and from the computer system 1100. In some implementations, the software may be stored on a portable storage medium, and may be inputted into the computer system 1100 via the portable storage medium device 1150. The peripheral device(s) 1140 may include any type of computer support device, such as, for example, an I/O (input/output) interface configured to add additional functionality to the computer system 1100. For example, the peripheral device(s) 1140 may include a network interface card for interfacing the computer system 1100 with a network 1120.

The input control device(s) 1180 provide a portion of the user interface for a user of the computer system 1100. The input control device(s) 1180 may include a keypad and/or a cursor control device. The keypad may be configured to input alphanumeric and/or other key information. The cursor control device may include, for example, a mouse, a trackball, a stylus, a touchpad, and/or cursor direction keys. In order to display textual and graphical information, the computer system 1100 may include the graphics subsystem 1160 and the output display 1170. The output display 1170 may include a CRT (cathode ray tube) display and/or a LCD (liquid crystal display). The graphics subsystem 1160 receives textual and graphical information, and processes the information for output to the output display 1170.

Each component of the computer system 1100 may represent a broad category of a computer component of a general and/or special-purpose computer. Components of the computer system 1100 are not limited to the specific implementations provided here.

Portions of the present technology may be conveniently implemented by using a general-purpose computer, a specialized digital computer and/or a microprocessor programmed according to the teachings of the present description, as will be apparent to those skilled in the computer art. Appropriate software coding may readily be prepared by skilled programmers based on the teachings of the present disclosure. Some implementations may also be implemented by the preparation of application-specific integrated circuits or by interconnecting an appropriate network of component circuits.

Some implementations include a computer program product. The computer program product may be a storage medium and/or media having instructions stored thereon and/or therein which can be used to control, or cause, a computer to perform any of the processes of the technology. The storage medium may include without limitation floppy disk, mini disk, optical disc, Blu-ray Disc, DVD, CD-ROM, microdrive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable storage medium and/or media, some implementations include software for controlling both the hardware of the general and/or special computer or microprocessor, and for enabling the computer or microprocessor to interact with a human user or other mechanism utilizing the results of the technology. Such software may include without limitation device drivers, operating systems, and user applications. Ultimately, such computer readable storage media further includes software for performing aspects of the technology, as described above.

Included in the programming and/or software of the general and/or special-purpose computer or microprocessor are software modules for implementing the processes described above. The processes described above may include without limitation the following: identifying on a video-controller one or more scene-boundaries, wherein a scene-boundary is associated with a video frame of at least one of a scene-start or a scene-end of a video; receiving a request to move a pointing-indicator, wherein the pointing-indicator is a graphical element rendered on a display device of a video-player system and is configured to coincide with input to the video-player system; calculating, in response to the request to move the pointing-indicator, a distance between the pointing-indicator and a particular scene-boundary; determining whether the distance between the pointing-indicator and a particular scene-boundary is less than a threshold; and snapping the pointing-indicator to the particular scene-boundary in response to determining the distance is less than the threshold.

CONCLUSION

A technology is provided to facilitate navigating through a video. Advantageously, the technology snaps a pointing-indicator to a scene-boundary of a video when the pointing-indicator is positioned less than a threshold-distance from the boundary-marker. Thus, the technology facilitates seeking of a scene-boundary of the video.

In the foregoing specification, the technology has been described with reference to specific implementations thereof. It will, however, be evident that various modifications and changes may be made thereto without departing from the broader spirit and scope of the technology. The specification and drawings are, accordingly, to be regarded in an illustrative rather than a restrictive sense.

As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an example" or "one example" or "an implementation" or "one implementation" throughout is not intended to mean the same example or implementation unless described as such.

What is claimed is:

1. A method comprising:
   determining, by a processor device, one or more scene boundaries of scenes of a video before completing loading content of the video, wherein each of the one of more scene boundaries is associated with a video frame of at least one of a scene-start or a scene-end of the video;
   identifying, by the processor device, the one or more scene-boundaries in a user interface, the user interface presenting a seekbar with a scrubber representing a currently-played location in the video, the currently-played location to be changed by moving the scrubber using a pointing indicator, the user interface further presenting, with the seekbar, one or more boundary markers visually representing the one or more scene boundaries;
   receiving, by the processor device, a request to move the pointing-indicator in the user interface;
   calculating, in response to the request to move the pointing-indicator, a distance between the pointing-indicator and a particular boundary marker visually representing a scene-boundary of the one or more scene boundaries, the pointing-indicator being positioned separately from the scrubber and the one or more boundary markers;
   determining whether the distance between the pointing-indicator and the particular boundary marker visually representing the scene-boundary is less than a threshold radius associated with the scene-boundary, wherein the threshold radius is calculated without user input based on dimensions associated with a presentation of the video, and wherein the calculated threshold radius is less than a threshold distance determined based on distances between the scenes of the video; and
   responsive to the pointing-indicator passing within the threshold radius such that the distance is less than the threshold radius, snapping, by the processor device, the pointing-indicator to the particular boundary marker visually representing the scene-boundary in the user interface.

2. The method of claim 1, further comprising, in response to the snapping, continuing playback of the video from the particular scene-boundary.

3. The method of claim 1, further comprising:
   providing the one or more boundary-markers to facilitate navigation on a timeline in the user interface.

4. The method of claim 1, wherein the snapping of the pointing-indicator is associated with at least one of an audio signal or a vibration signal.

5. The method of claim 1, wherein the dimensions associated with the presentation of the video comprise dimensions of at least one of the user interface, a window associated with the video, or a display device.

6. The method of claim 1, further comprising providing an options menu that enables customization of snapping functionality, wherein the options menu provides an additional user-interface for a manual update of the threshold radius.

7. The method of claim 1, further comprising receiving from a server a script that enables display of the user interface in conjunction with the one or more scene-boundaries.

8. The method of claim 1, further comprising displaying the user interface in response to receiving the request to move the pointing-indicator over a video display area.

9. The method of claim 1, wherein the pointing-indicator is associated with a contact point on a touchscreen.

10. The method of claim 1, wherein the determining one or more scene boundaries of scenes of a video comprises:
for a frame of the video, computing a similarity to a nearby frame; and
identifying the frame as a scene boundary of the one or more scene boundaries responsive to determining that the similarity to the nearby frame is less than a similarity threshold.

11. The method of claim 1, wherein the user interface comprises a video controller including the scrubber that is movable along a single dimension representing time, and wherein the threshold radius comprises a threshold linear distance along the single dimension.

12. A computing device comprising:
a memory; and
a processor device coupled to the memory, the processor device to:
determine one or more scene boundaries of scenes of a video before completing loading content of the video, wherein each of the one of more scene boundaries is associated with a video frame of at least one of a scene-start or a scene-end of the video;
identify the one or more scene-boundaries in a user interface, the user interface presenting a seekbar with a scrubber representing a currently-played location in the video, the currently-played location to be changed by moving the scrubber using a pointing indicator, the user interface further presenting, with the seekbar, one or more boundary markers visually representing the one or more scene boundaries;
receive a request to move the pointing-indicator in the user interface;
calculate, in response to the request to move the pointing-indicator, a distance between the pointing-indicator and a particular boundary marker visually representing a scene-boundary of the one or more scene boundaries, the pointing-indicator being positioned separately from the scrubber and the one or more boundary markers;
determine whether the distance between the pointing-indicator and the particular boundary marker visually representing the scene-boundary is less than a threshold radius associated with the scene-boundary, wherein the threshold radius is calculated without user input based on dimensions associated with a presentation of the video, and wherein the calculated threshold radius is less than a threshold distance determined based on distances between the scenes of the video; and
responsive to determining that the distance is less than the threshold radius, snap the pointing-indicator to the particular boundary marker visually representing the scene-boundary in the user interface.

13. The computing device of claim 12, wherein the processor device is further to:
receive from a server a script that enables display of the user interface in conjunction with the one or more scene-boundaries.

14. The computing device of claim 12, wherein the processor device is further to:
provide the one or more boundary-markers to facilitate navigation on a timeline in the user interface.

15. The computing device of claim 12, wherein the snap of the pointing-indicator is associated with a vibration signal on a touchscreen of the display device.

16. The computing device of claim 12, wherein the dimensions associated with the presentation of the video comprise dimensions of at least one of the user interface, a window associated with the video, or a display device.

17. The computing device of claim 12, wherein the processor device is further to:
provide an options menu to enable customization of snapping functionality, wherein the options menu provides an additional user-interface for a manual update of the threshold radius.

18. One or more non-transitory computer-readable storage media comprising instructions to facilitate navigating through a video, where the instructions, when executed, direct a processor device to perform actions comprising:
determining, by the processor device, one or more scene boundaries of scenes of the video before completing loading content of the video, wherein each of the one of more scene boundaries is associated with a video frame of at least one of a scene-start or a scene-end of the video;
identifying, by the processor device, the one or more scene-boundaries in a user interface, the user interface presenting a seekbar with a scrubber representing a currently-played location in the video, the currently-played location to be changed by moving the scrubber using a pointing indicator, the user interface further presenting, with the seekbar, one or more boundary markers visually representing the one or more scene boundaries;
receiving, by the processor device, a request to move the pointing-indicator in the user interface;
calculating, in response to the request to move the pointing-indicator, a distance between the pointing-indicator and a particular boundary marker visually representing a scene-boundary of the one or more scene boundaries, the pointing-indicator being positioned separately from the scrubber and the one or more boundary markers;
determining whether the distance between the pointing-indicator and the particular boundary marker visually representing the scene-boundary is less than a threshold radius associated with the scene-boundary, wherein the threshold radius is calculated without user input based on dimensions associated with a presentation of the video, and wherein the calculated threshold radius is less than a threshold distance determined based on distances between the scenes of the video; and
responsive to the pointing-indicator passing within the threshold radius such that the distance is less than the threshold radius, snapping, by the processor device, the pointing-indicator to the particular boundary marker visually representing the scene-boundary in the user interface.

19. The one or more non-transitory computer-readable storage media of claim 18, where the instructions, when executed, direct the processor device to perform further actions comprising, in response to the snapping, continuing playback of the video from the particular scene-boundary.

20. The one or more non-transitory computer-readable storage media of claim 18, wherein the user interface further provides the one or more boundary-markers to facilitate navigation on a timeline in the user interface.

21. The one or more non-transitory computer-readable storage media of claim 18, where the instructions, when executed, direct the processor device to perform further actions comprising, displaying the user interface in response to receiving the request to move the pointing-indicator over a video display area.

22. The one or more non-transitory computer-readable storage media of claim 18, wherein the dimensions associated with the presentation of the video comprise dimensions of at least one of the user interface, a window associated with the video, or a display device.

* * * * *